United States Patent [19]

Tucking et al.

[11] 3,717,426
[45] Feb. 20, 1973

[54] OVERPRESSURE EXTERNAL SIZING TOOL

[75] Inventors: Werner Tucking; Gerhard Roder, both of Frankfurt/Main, Germany

[73] Assignee: Farbwerke Hoechst Aktiengesellschaft vormals Meister Lucius & Bruning, Frankfurt/Main, Germany

[22] Filed: Dec. 3, 1970

[21] Appl. No.: 94,645

[30] Foreign Application Priority Data

Dec. 5, 1969 Germany...................P 19 61 060.7

[52] U.S. Cl..................................425/71, 425/445
[51] Int. Cl..............................................B29c 25/00
[58] Field of Search .......18/12 TT, 14 S, 14 A, 14 R, 18/14 G, 8 QM; 264/178 R, 178 F, 237, 348; 425/71, 445; 165/154

[56] References Cited

UNITED STATES PATENTS

| 3,057,013 | 10/1962 | Loveless | 18/14 A X |
|---|---|---|---|
| 3,129,461 | 4/1964 | Zavasnik et al. | 18/14 A X |
| 3,538,210 | 11/1970 | Gatto | 18/14 A X |
| 3,233,024 | 2/1966 | Jackson et al. | 18/14 A X |
| 3,039,142 | 6/1962 | Zavasnik | 18/14 A X |
| 3,184,791 | 5/1965 | Gamble et al. | 18/14 |

FOREIGN PATENTS OR APPLICATIONS 984,406    1965    Great Britain

Primary Examiner—J. Spencer Overholser
Assistant Examiner—David S. Safran
Attorney—Curtis, Morris & Safford

[57] ABSTRACT

An overpressure external sizing tool for extruded hollow profiles of thermoplastic material is described which consists of a sizing bushing which is cooled by a liquid and firmly mounted on the front side, facing the extruder, of a cooling trough, and of draw plates arranged on guiding means within the cooling trough so that they can be longitudinally shifted. The draw plates are provided with individual connections for a cooling liquid and with bores opening into enlarged cross-sections of the draw plate apertures for allowing the cooling liquid to immediately contact the hollow profile as it proceeds through the sizing arrangement. The arrangement permits to fully use the throughput capacity of modern extruders while enabling easy access to the individual stations while starting up the extrusion.

5 Claims, 9 Drawing Figures

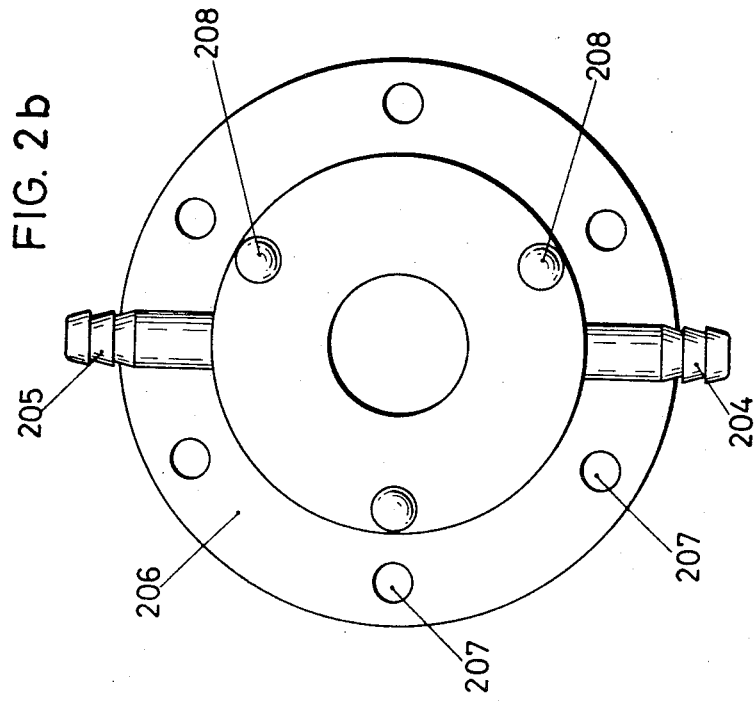
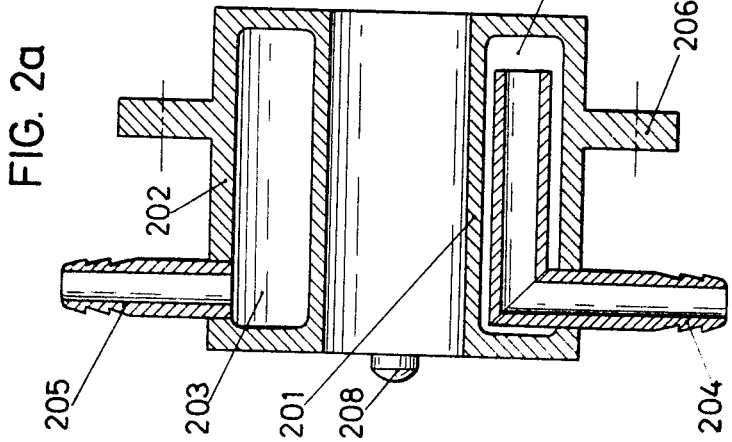

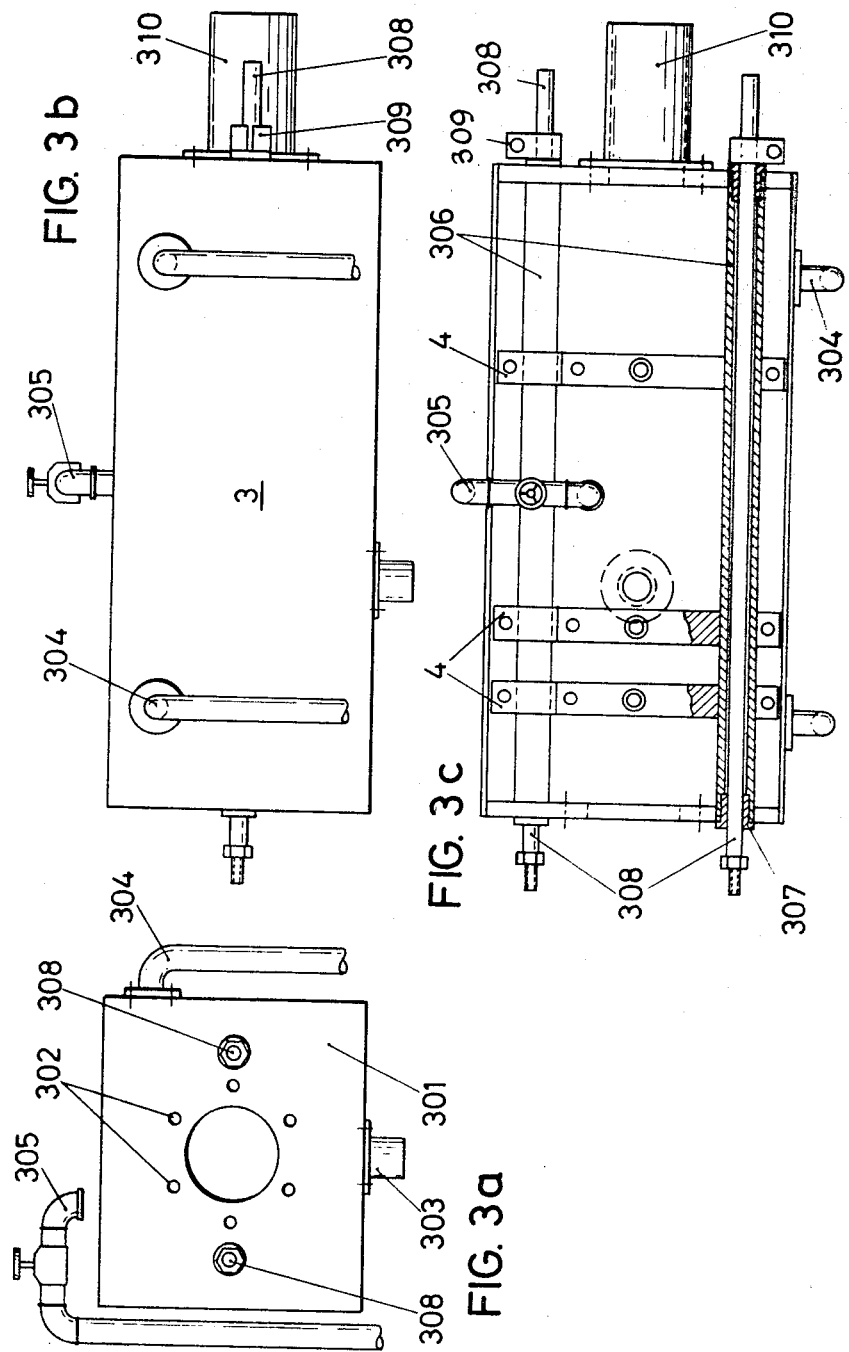

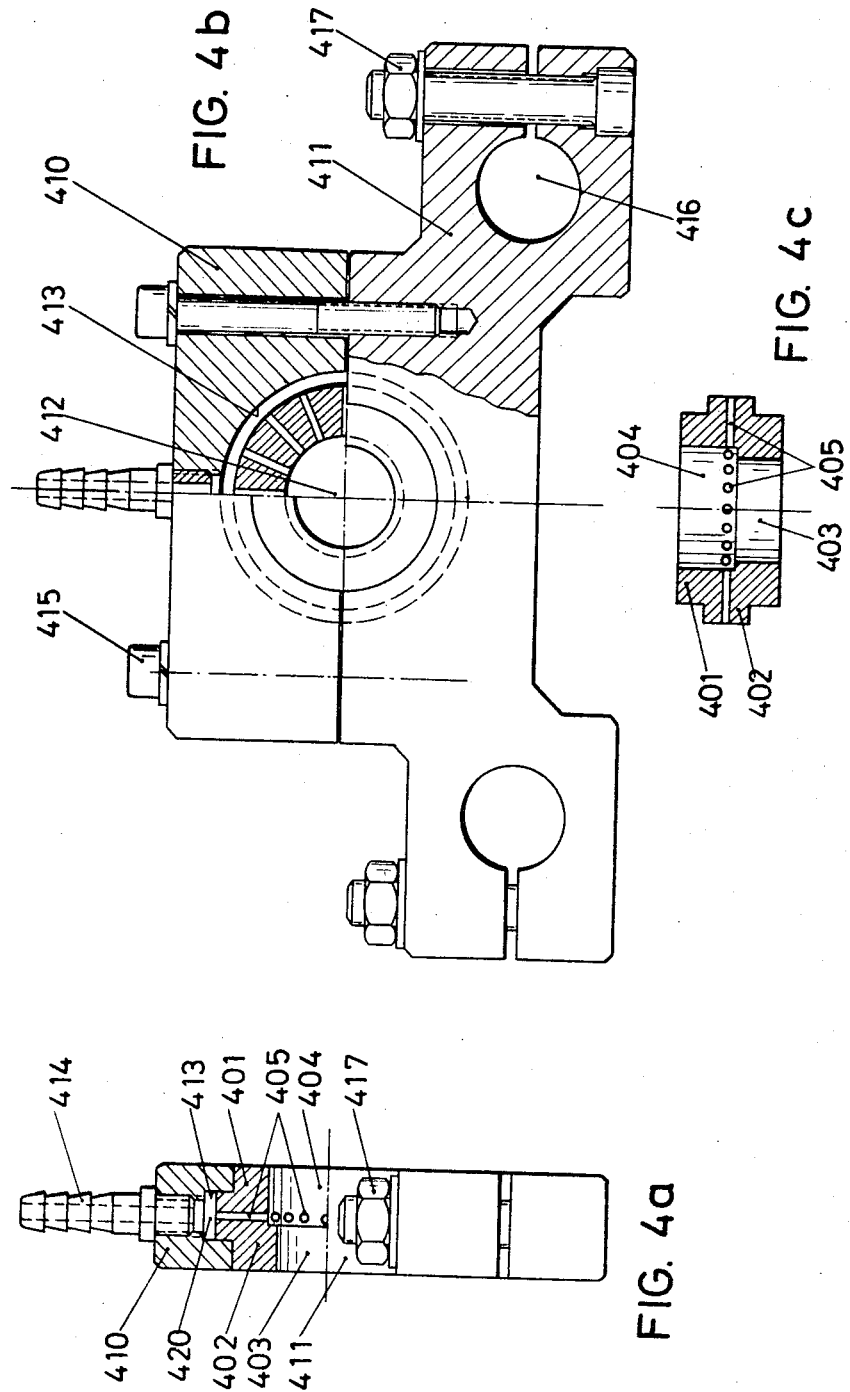

OVERPRESSURE EXTERNAL SIZING TOOL

The present invention relates to an overpressure external sizing tool for extruded hollow profiles of thermoplastic material.

In the extrusion of hollow profiles of thermoplastic material, the hollow profile which leaves the profile nozzle in the plastic state must be given in sizing tools the intended measures and tolerances and simultaneously solidified by heat exchange to such an extent that it can be taken up and finally cooled in a cooling bath without undesirable deformation. Depending on the properties desired in the hollow profile, an external or internal sizing is chosen. In external sizing, the contact between profile and sizing tool is obtained by applying an internal overpressure (overpressure sizing) or a reduced external pressure (vacuum sizing).

In overpressure external sizing, a gaseous pressure transfer medium is introduced through an aperture disposed in the extrusion head into the hollow profile which is closed at one end, whereby the hollow profile is pressed against the cooled sizing tool and is simultaneously sized, cooled and solidified while being passed through the sizing tool.

The overpressure external sizing is carried out with the use of sizing bushings which are cooled with the help of a cooling liquid flowing through the bushing or with the use of several sizing or draw plates disposed in a cooling trough and surrounded by cooling liquid. Cooled sizing bushings have the advantage that the extrudate need not be drawn to a smaller diameter when it is introduced into the sizing tool. Contrary to draw plates, the sizing bushing may be directly connected with the extruder nozzle. Sizing bushings have the disadvantage, however, that they must be relatively long in order to obtain an intense cooling so that relatively high frictional forces are produced. With high take-up speeds which are interesting from an economical viewpoint, said frictional forces may be greater than the tensile strength of the profile wall which is still hot so that the hollow profile leaving the sizing tool is drawn to a smaller diameter or torn off. To reduce wall friction it has been proposed to introduce a cooling liquid into at least one permeable section of the sizing zone. As the temperature of the extrudate is generally considerably higher than the boiling temperature of the cooling liquid, a boundary layer of a mixture of water and water vapor is formed on the profile surface whereby the heat transfer is reduced. In view of the high throughput capacity of extruders of modern type, the capacity of the entire plant is generally limited by the efficiency of the sizing tool.

When draw plates disposed in a cooling bath are used for external sizing, the extruder nozzle and the cooling trough must be at a distance from one another because the packing in the intake zone requires the extrudate to be drawn to a smaller diameter. The pressure tolerances are very small because too high a pressure may cause the extrudate to be deformed or torn up between the nozzle and the first draw plate whereas no tubes of exact size are obtained under too low a pressure. Because of the reduced friction, the use of draw plates for overpressure external sizing would permit higher take-up speeds than those obtained with cooled sizing bushings. However, since the heat exchange is brought about almost exclusively by convection, it takes place much more slowly than by heat conduction with the help of metal. The sizing zone is therefore very long and the whole tool unhandy. The take-up speed is limited in this case by the cooling power. It is moreover complicated to start the plant and difficult to remove break-downs. As the extrudate from the extruder nozzle must enter the cooling liquid after a short passage through air there is a danger that the cooling liquid may flow back to the hot extruder. This gives readily rise to a pronounced formation of water vapor and to partial supercooling of the nozzle.

In the interest of economy, a sizing tool should, on the one hand, permit a take-up speed that corresponds to the throughput capacity of the extruder, while, on the other hand, it should be possible to start the plant and remove any possible break-downs in a quick and reliable manner. Furthermore, the sizing tool should substantially avoid changes in the cross-section of the profile, which may give rise to anisotropies due to orientation, and should enable surfaces of optimum quality to be obtained.

The overpressure external sizing tool of the invention overcomes the above disadvantages.

The present invention provides an overpressure external sizing tool for extruded hollow profiles of thermoplastic materials, which comprises a sizing bushing cooled by a liquid, a cooling trough and draw or sizing plates, the sizing bushing being rigidly connected in tight manner with the front wall of the cooling trough in which several draw plates are disposed on a guide member in a manner such that they can be shifted in the longitudinal direction, each draw plate being provided with a connecting piece for cooling liquid and with bores which open into an enlarged cross-section of the draw plate-aperture and allow the cooling liquid to flow through between the enlarged section of the draw plate and the surface of the profile.

This combination of sizing bushing, cooling trough and draw plates through which cooling liquid flows, enables an intense cooling to be obtained within a relatively short distance. The sizing bushing may be so short that no disturbing pronounced friction takes place. The obtainable takeup speeds correspond to the throughput capacity of modern extruders. The sizing tool of the invention has the particular advantage that the cooling trough need not be filled when starting the plant or when performing any operations, for example, for removing working troubles, so that the cooling liquid cannot flow back to the extruder nozzle. The direct contact of the profile with cooling liquid in the draw plates is sufficient for adequately solidifying the profile when starting the plant. It is not until the extrusion process takes a satisfactory course, that the cooling trough is filled to the overflow.

The speed of extrusion may then be increased to the desired take-up speed. As the sizing bushing generally rests firmly against the extruder nozzle and the profile entering the cooling trough has been solidified to such an extent that it is not expanded by the internal pressure, the profile undergoes no substantial deformation during the entire sizing operation. Any small bubbles which may possibly be formed are immediately torn off by the rapid uniform stream of cooling liquid directed to the whole profile surface in the draw plates. Without degassing the cooling liquid, an excellent smooth surface is obtained.

An overpressure external sizing tool for extruded hollow profiles of thermoplastic material, constructed in accordance with the invention will now be described in more detail by way of example with reference to the accompanying drawings of which FIG. 1 is an assembly view of a tube extrusion plant, FIG. 2a is a longitudinal section through a sizing bushing, FIG. 2b is a plan view of the sizing bushing shown in FIG. 2a.

FIG. 3a is a front view of a cooling trough,

FIG. 3b is a side view, partially in section, of the cooling trough shown in FIG. 3a, FIG. 3c is a plan view, partially in section, of the cooling trough shown in FIG. 3a, FIG. 4a is a side view, partially in section, of a draw plate, FIG. 4b is a front view, partially in section, of the draw plate shown in FIG. 4a, and FIG. 4c is a sectional elevation of the interior draw plate-insertion.

Figure 1:
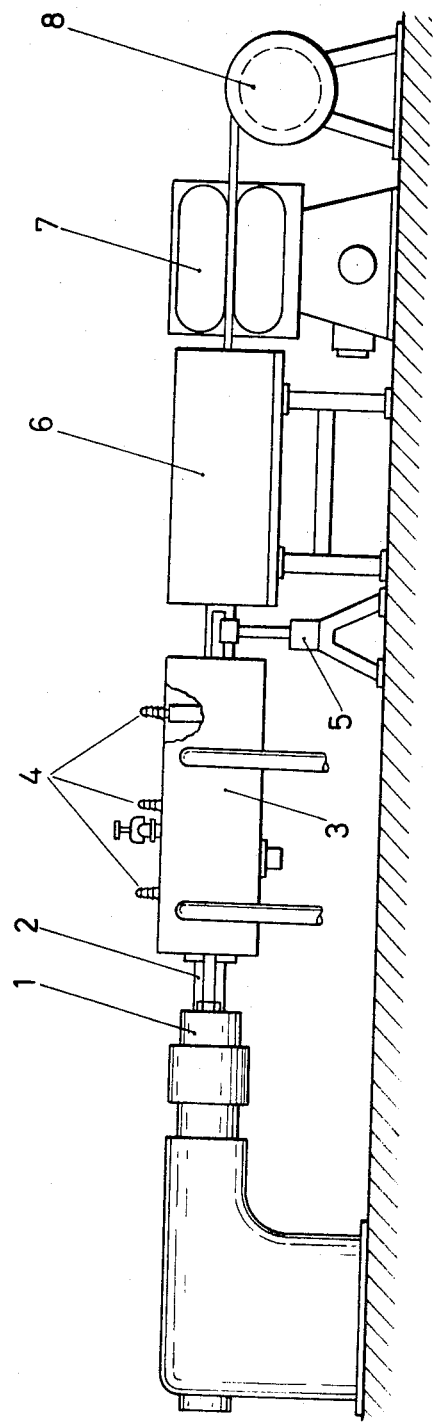

In FIG. 1 there are shown the nozzle orifice 1 of the extrusion head, the sizing bushing 2, the cooling trough 3, the draw plates 4, a support 5, a cooling bath 6 connected in series, a take-up 7 and a winder 8.

In the sizing bushing shown in FIGS. 2a and b, a cooling chamber 203 is disposed between inner wall 201 and outer wall 202 of the bushing. Through the cooling chamber a cooling liquid flows, entering through short inlet pipe 204 and leaving through short outlet pipe 205. A mounting flange 206 with tapholes or apertures 207 serves to secure the bushing to the front wall of cooling trough 3. The bushing is sealed with respect to cooling water by interposed packing rings not shown in the drawing. To secure the sizing bushing to the orifice 1 in a manner such that it cannot be displaced, the sizing bushing is provided at the front with centering cams 208 which engage with the orifice.

In FIGS. 3a, 3b and 3c, showing the cooling trough 3, the front wall of the trough is designated by 301. Tapholes or apertures 302 serve to fasten the flange 206 of the sizing bushing 2. A short outlet pipe disposed at the bottom is represented at 303, and overflows are designated by 304. The cooling agent is supplied at 305. The pipes 306 running in the longitudinal direction through the trough are provided with draw plates 4 which can be shifted in the longitudinal direction and arrested. Through these pipes 306 which are provided at each end with an internal guide bush 307, bars 308 are passed which are secured to the orifice 1 of the extruder and on which the cooling trough can be shifted in the longitudinal direction. The trough can be arrested on the bars 308 by appropriate devices 309. After the cooling trough, the bars 308 rest on support 5. The cooling trough is provided at the rear end with a short pipe 310 through which the profile is passed into the series-connected cooling bath 6. This short pipe is so long that it projects into the cooling bath 6 even after the sizing tool has been moved up to the orifice 1. The inner cross-section of the short pipe is somewhat larger than the profile so that cooling liquid can flow through and no friction occurs. Leakage losses of cooling liquid are prevented by a packing at the inlet to the cooling bath 6.

FIGS. 4a, 4b and 4c show a draw plate. The draw plate-insertion 401 is provided with an annular collar 402 and a circular draw plate-aperture 403 having a unilaterally enlarged cross-section 404. From the enlarged cross-section radial or tangential bores 405 extend to the exterior. The draw plate-insertion is placed in a separable yoke comprising an upper part 410, a lower part 411 and a bore 412 which is provided with an annular groove 413 and disposed centrally in the plane of division. The upper part 410 is provided with a connecting piece 414 for the cooling liquid and is secured to lower part 411 by screws 415. The lower part is provided with two slot holes 416 for guiding the draw plates on pipes 306 and with attachment screws 417 for arresting the draw plates. By setting the draw plate-insertion in the yoke an annular channel 420 is formed between the collar 402 of the insertion and the annular groove 413 of bore 412. Through this annular channel 420 the cooling liquid flows from connecting piece 414 to the radial or tangential bores 405.

In a particularly advantageous form, the sizing bushing which is rigidly connected with the cooling trough is provided at the front end with at least 3 centering cams 208 which engage with centering grooves of the nozzle orifice so that the bushing is joined to the nozzle orifice without being displaced and without a gap being formed, while the bars 308 passed through the guide members for the draw plates are releasably connected with the nozzle orifice. In this manner, the whole sizing tool is rigidly connected with the nozzle in a manner such that it can be shifted in the longitudinal direction. The rear ends of the bars 308 rest on a support 5 which can advantageously be adjusted laterally and in height. Owing to this centered assembly, the sizing tool follows every after-adjustment of the nozzle without being displaced.

By exchanging the sizing parts, i.e., the nozzle, the bushing and the draw plates, tubes of various diameters or profiles the cross-section of which is not circular can be treated using the sizing tool of the invention.

The sizing bushing is advantageously made of corrosion and wear resistant metal having as high a thermal conductivity as possible, for example a special alloy of copper and beryllium. The cooling agent is preferably introduced in a manner such that it strikes baffle plates, thus producing turbulences.

To obtain high speeds of take-up the sizing bushing is advantageously short. In the extrusion of tubes, excellent results were, for example, obtained with a ratio of length of bushing: tube diameter within the range of from 5 : 1 to 1 : 1. The draw plates may be shorter. A ratio of length of draw plate: tube diameter within the range of from 1 : 4 to 1 : 1 has proved advantageous. The length of the enlarged cross-section of the draw plates is generally half the length of the draw plate. This value is not critical, however. After passing the profile through the draw plate, a slit-shaped channel is obtained around the profile owing to the enlarged cross-section, which enables a cooling agent to be passed through. The cooling agent is preferably supplied to the surface of the profile. It is also possible, however, to suck off cooling agent from the trough through the draw plates. In each case, formation of small bubbles on the surface of the profile is prevented by the rapid stream of cooling agent. The required number of draw plates depends on the intended intensity of cooling or the rate of taking-up. The draw plates are preferably spaced apart such that the distances between them become larger with the distance from the extruder.

To ensure that the profile always makes good contact with the draw plates, the inside diameters of the draw plates are advantageously reduced down to the desired final diameter as the distance from the extruder increases (increasing cooling of the tube), correspondingly to the shrinkage behavior of the thermoplastic treated.

The sizing tool of the invention has the particular advantage that the outside diameter of the profile need not be changed between the nozzle and the sizing tool, for example, by drawing the profile to a smaller diameter. It is therefore possible to vary the wall thickness of the profile within wide limits with a given nozzle slot by varying the take-up speed and obtain a wall thickness that is thicker or considerably smaller than the nozzle slot.

To assemble the plant, the cooling trough is laid with both bars on the support and secured to the nozzle orifice. Then the sizing tool is pushed forward on the bars to the stop and arrested in this position. When starting the extruder, the hollow profile is shut in known manner, drawn through the sizing tool and charged in the interior with an overpressure. First only the cooling of the bushing and the draw plates is turned on. Until the extrusion proceeds correctly, the cooling agent entering through the draw plates is discharged through the bottom outlet of the cooling trough so that the extrusion can be well controlled and no cooling liquid can flow back to the extruder. At the speed of extrusion commonly used when starting the extruder, the cooling of the draw plates is sufficient for preventing deformation of the profile. In this state, any operation which may become necessary, for example squeezing-off the profile, can be performed without difficulty. If it is necessary to after-center the nozzle, the sizing tool follows this shifting immediately and without displacement thanks to the bars and the adjustable supports. It is not until the extrusion takes a satisfactory course that the cooling trough is filled up to the upper outlet so that the profile is entirely surrounded by the cooling liquid, and the speed of extrusion is increased to the desired output capacity. The tube is finally cooled in the following cooling bath the length of which depends on the speed of extrusion and the wall thickness of the profile. Owing to the intense cooling by means of sizing bushing, cooling trough and the direct contact with cooling liquid in the draw plates, very high speeds of extrusion can be obtained. For example, a tube of low pressure polyethylene having an outside diameter of 25 millimeters and a wall thickness of 2.0 millimeters could be taken-up at a rate of 20 meters/minute. With this rate of output the upper limiting performance of the extruder was reached.

What is claimed is:

1. An overpressure external sizing tool for use with an extruding device adapted to form extruded hollow profiles of thermoplastic material comprising, a liquid cooled hollow sizing bushing having a central opening through which an extruded profile passes from said extruder, a cooling trough having a front wall positioned opposite said extruder, said sizing bushing being rigidly mounted on said cooling trough, at least one elongated guide member mounted in said cooling trough, and a plurality of draw plates slidably mounted in said trough on said guide member, said draw plates each having a central aperture located in axial alignment with the central opening in said sizing bushing, a plurality of bores opening towards said central apertures and means for connecting said bores in fluid communication with a cooling liquid, said central aperture in said draw plates having cross-sectional areas greater than the cross-sectional area of the opening in said sizing bushing whereby said extruded profile is initially cooled by said sizing bushing and thereafter further cooled by contact with liquid flowing from said bores in said drawing plates.

2. The overpressure external sizing tool as defined in claim 1 wherein said extruder has a centering groove formed therein opposite said sizing bushing and wherein said sizing bushing includes a plurality of projections for engaging said groove and centering the opening therein with respect to said extruder.

3. The overpressure external sizing tool as defined in claim 1 wherein said guide member includes means for releasably and adjustably connecting said trough to said extruder whereby the position of said sizing tool with respect to said extruder is variable.

4. The overpressure external sizing tool as defined in claim 1 wherein each of said draw plates comprises a separable yoke adjustably mounted on said guide member, said yokes having a central bore and an annular groove formed therein about the periphery of said bore, and a draw plate-insertion member mounted in said bore and having said first mentioned bores formed therein, said draw plate-insertion member cooperating with said annular groove to define an annular enclosed channel providing communication between said first mentioned bores and connected to said means for connecting said bores in fluid communication with a cooling liquid whereby said cooling liquid flows into said channel and is discharged through said first mentioned bores to cool a profile passing through said draw plates.

5. The overpressure external sizing tool as defined in claim 4 wherein said yoke comprises a pair of yoke sections having recesses therein defining respective portions of said central bore, and means operatively interconnecting said yoke sections in mating relation whereby said recesses cooperate to define said central bore.

* * * * *